(12) United States Patent  
Bouldin et al.

(10) Patent No.: US 11,125,158 B2  
(45) Date of Patent: Sep. 21, 2021

(54) PORTED SHROUD SYSTEM FOR TURBOPROP INLETS

(71) Applicant: HONEYWELL INTERNATIONAL INC., Morris Plains, NJ (US)

(72) Inventors: Bruce Dan Bouldin, Phoenix, AZ (US); Derek Anthony Rice, Phoenix, AZ (US); Michael Todd Barton, Phoenix, AZ (US); Raymond Mccage, Chandler, AZ (US); Yates Wong, Humboldt, AZ (US); Kevin Sing, Mesa, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 219 days.

(21) Appl. No.: 16/132,954

(22) Filed: Sep. 17, 2018

(65) Prior Publication Data

US 2020/0088097 A1   Mar. 19, 2020

(51) Int. Cl.  
*F02C 7/057* (2006.01)  
*B64D 33/02* (2006.01)  
(Continued)

(52) U.S. Cl.  
CPC .............. *F02C 7/057* (2013.01); *B64D 33/02* (2013.01); *F01D 1/14* (2013.01); *F01D 25/02* (2013.01); *F01D 25/10* (2013.01); *F01D 25/14* (2013.01); *F02C 3/06* (2013.01); *F02C 7/04* (2013.01); *F02C 7/047* (2013.01); *F02C 9/18* (2013.01);  
(Continued)

(58) Field of Classification Search  
CPC ............ B64D 33/02; B64D 2033/0233; B64D 2033/0293; F01D 25/02; F01D 17/105; F01D 25/10; F01D 25/14; F01D 1/023; F01D 1/12; F01D 1/14; F05D 2250/51; F05D 2250/73; B64C 7/02; F04D 27/0207; F04D 27/0215; F04D 27/023; F04D 27/0238; F04D 29/584; F04D 29/5853;  
(Continued)

(56) References Cited

U.S. PATENT DOCUMENTS 5,483,791 A * 1/1996 Kotwal .................... F02C 7/04  
60/796  
6,447,241 B2 * 9/2002 Nakao ................ F04D 29/4213  
415/1  
(Continued)

OTHER PUBLICATIONS

TPE331 Pilot Tips; TPTE33 (Series-1 through -15) May 2004.  
(Continued)

*Primary Examiner* — Christopher Verdier  
(74) *Attorney, Agent, or Firm* — Lorenz & Kopf, LLP (57) ABSTRACT

A system for delivering a flow stream of a gas to a compressor. A shroud extends from an inlet to the compressor and defines a main inlet passage configured to direct the flow stream from the inlet to the compressor. A communication plenum is separated from the main inlet passage. A port system includes first and second port subsystems that each provide an opening between the main inlet passage and the communication plenum. The first port subsystem is disposed further from the compressor than the second port subsystem. The port system is configured so that a portion of the gas enters or exits the compressor through the second port subsystem, depending on operating conditions of the compressor.

20 Claims, 7 Drawing Sheets

(51) Int. Cl.

| | |
|---|---|
| *F02C 3/06* | (2006.01) |
| *F02C 9/18* | (2006.01) |
| *F02C 7/047* | (2006.01) |
| *F02C 7/04* | (2006.01) |
| *F01D 25/02* | (2006.01) |
| *F01D 25/10* | (2006.01) |
| *F01D 25/14* | (2006.01) |
| *F01D 1/14* | (2006.01) |
| *F04D 27/02* | (2006.01) |
| *F04D 29/58* | (2006.01) |
| *F02C 6/20* | (2006.01) |

(52) U.S. Cl.
CPC ....... *F04D 27/023* (2013.01); *F04D 27/0238* (2013.01); *F04D 29/5853* (2013.01); *B64D 2033/0233* (2013.01); *B64D 2033/0293* (2013.01); *F02C 6/206* (2013.01); *F05D 2220/323* (2013.01); *F05D 2250/51* (2013.01); *F05D 2250/73* (2013.01)

(58) Field of Classification Search
CPC .. F02C 7/04; F02C 7/057; F02C 6/206; F02C 3/13; F02C 9/18
USPC .............................. 415/57.1–57.4, 58.3, 58.4
See application file for complete search history.

(56) References Cited

U.S. PATENT DOCUMENTS

| | | | |
|---|---|---|---|
| 6,488,469 | B1 | 12/2002 | Youssef et al. |
| 6,699,008 | B2 | 3/2004 | Japikse |
| 7,025,557 | B2 | 4/2006 | Japikse et al. |
| 8,061,974 | B2 | 11/2011 | Gu et al. |
| 8,210,794 | B2 | 7/2012 | Nolcheff et al. |
| 8,490,408 | B2 | 7/2013 | Nichols et al. |
| 8,882,443 | B2 | 11/2014 | Agneray et al. |
| 9,057,329 | B2 | 6/2015 | Weir et al. |
| 9,322,337 | B2 | 4/2016 | Little et al. |
| 9,377,030 | B2 | 6/2016 | Matwey et al. |
| 9,650,916 | B2 | 5/2017 | Barton et al. |
| 9,726,084 | B2 | 8/2017 | Duong et al. |
| 9,810,157 | B2 | 11/2017 | Nichols et al. |
| 9,964,114 | B2 | 5/2018 | Taylor-Tibbott |
| 2012/0121400 | A1* | 5/2012 | Tomita ................ F04D 27/0238 415/206 |
| 2013/0017066 | A1 | 1/2013 | Nolcheff et al. |
| 2015/0056062 | A1* | 2/2015 | Tamaki ............... F04D 27/0207 415/58.4 |
| 2016/0017791 | A1* | 1/2016 | Nakao ..................... F04D 25/02 415/203 |
| 2017/0175769 | A1 | 6/2017 | Sun et al. |
| 2017/0211586 | A1 | 7/2017 | Gage et al. |
| 2017/0241341 | A1 | 8/2017 | Gekht et al. |
| 2017/0241342 | A1 | 8/2017 | Gekht et al. |
| 2017/0260903 | A1 | 9/2017 | Brogna et al. |

OTHER PUBLICATIONS

Numakura, R. et al.; Effect of a Recirculation Device on the Performance of Transonic Mixed Flow Compressors; ASME Turbo Expo 2014: Turbine Technical Conference and Exposition, vol. 2D: Turbomachinery Düsseldorf, Germany, Jun. 16-20, 2014.

Gancedo, M. et al.;PIV Measurements of Flow in Recirculation Cavities at the Inlet of a Centrifugal Compressor; 50th AIAA Aerospace Sciences Meeting, Jan. 9-12, 2012, Nashville, TN.

Slovisky, J. et al.; Numerical Designed Experiment to Optimize a Ported Shroud to Extend the Operability Margin of a Centrifugal Compressor; Conference Paper—Jan. 2005.

\* cited by examiner

PORTED SHROUD SYSTEM FOR TURBOPROP INLETS

STATEMENT REGARDING FEDERALLY SPONSORED RESEARCH OR DEVELOPMENT

This invention was made with Government support under contract number FA8650-15-D-2504 awarded by the United States Department of the Air Force. The Government has certain rights in the invention.

TECHNICAL FIELD

Embodiments of the subject matter described herein relate generally to inlet flow optimization and compressor performance enhancement in turbomachinery. More particularly, embodiments of the subject matter relate to inlet shroud systems for engines with complex inlets, such as found in turboprop engines.

BACKGROUND

Compressors are used in a wide range of applications to increase the flow rate/density of a gas flow stream. A number of applications for compressors involve engines, including gas turbine engines and turbocharged engines. Non-engine applications for compressors are also common. In some applications, the air inlet to the compressor is complex in shape. For example, the inlet may be of a shape other than circular to fit the available packaging space dictated by other components. One such application involves a turboprop engine where the air inlet is "smile" shaped to allow room for a gearbox connected with a propeller located at the front of the engine, and where a high inlet flow velocity is common. Optimizing the flow of air in applications such as a turboprop engine, for example to maximize compressor performance over a wide range of operating conditions, is challenging due to the shape of the air inlet and the flow rates involved.

Accordingly, it is desirable to provide an improved air inlet design for air flow applications involving a complex inlet shape and/or high flow velocities. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description section of this disclosure. This summary is not intended to identify key or essential features of the claimed subject matter, nor is it intended to be used as an aid in determining the scope of the claimed subject matter.

In a number of embodiments, a system delivers a flow stream of a gas to a compressor. A shroud extends from an inlet to the compressor and defines a main inlet passage configured to direct the flow stream from the inlet to the compressor. A communication plenum is separated from the main inlet passage. A port system includes first and second port subsystems that each provide an opening between the main inlet passage and the communication plenum. The first port subsystem is disposed further from the compressor than the second port subsystem. The port system is configured so that a portion of the gas enters or exits the compressor through the second port subsystem, depending on operating conditions of the compressor.

In other embodiments, a system for delivering a flow stream of gas includes a compressor configured to receive the gas and to increase a pressure of the gas. The compressor includes an impeller that is rotatable about an axis. A shroud extends from an inlet that is open to atmosphere to the compressor at a location around the impeller. The shroud defines a main inlet passage configured to direct the gas from the inlet to the compressor. The main inlet passage transitions from a first shape at the inlet to a second shape at the compressor that differs substantially from the first shape. A communication plenum is separated from the main inlet passage. A port system has first and second port subsystems that each provide an opening between the main inlet passage and the communication plenum. The first port subsystem is disposed further from the compressor than the second port subsystem. The port system is configured so that a portion of the gas enters the plenum from the main inlet passage through the second port subsystem and exits the plenum to the main inlet passage through the first port subsystem when the compressor has an excess of the gas, and the port system is configured so that alternatively, a portion of the gas enters the plenum from the main inlet passage through the first port subsystem and exits the plenum to the main inlet passage through the second port subsystem when the compressor has a deficiency of the gas.

In additional embodiments, a system for delivering a flow stream of gas in an engine includes a compressor configured to receive the gas and to increase a pressure of the gas directed into the engine. The compressor includes an impeller that is rotatable. A shroud extends from an inlet that is open to atmosphere to the compressor at a location around the impeller. The shroud defines a main inlet passage configured to direct the gas from the inlet to the compressor. The main inlet passage transitions from a first shape at the inlet to a second shape at the compressor that differs substantially from the first shape. A communication plenum is separated from the main inlet passage. A port system includes first and second port subsystems. The first port subsystem provides a first opening between a first point of the main inlet passage and the communication plenum. The second port subsystem provides a second opening between a second point of the main inlet passage and the communication plenum. The first point is configured with a lower pressure in the flow stream than the second point. The port system is configured so that a portion of the gas enters the plenum from the main inlet passage through the second port subsystem and exits the plenum to the main inlet passage through the first port subsystem to inhibit stall of the compressor. The port system is configured so that alternatively, a portion of the gas enters the plenum from the main inlet passage through the first port subsystem and exits the plenum to the main inlet passage through the second port subsystem to increase power output from the compressor.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In general, a ported shroud system delivers a flow stream of a gas to a compressor with improved power output or flow stream from the compressor with improved operability of the compressor. A shroud extends from an inlet to the compressor and defines a main inlet passage configured to direct the flow stream from the inlet to the compressor. A communication plenum is separated from the main inlet passage. A port system includes first and second port subsystems that each provide an opening between the main inlet passage and the communication plenum. The first port subsystem is disposed further from the compressor than the second port subsystem. The port system is configured so that a portion of the gas enters or exits the compressor through the second port subsystem, depending on operating conditions.

In the examples given herein, inlets are described in association with an aircraft turboprop engine, but the disclosure is not limited in utility to such an application. In the example of a turboprop engine, the air inlet has a complex, non-axisymmetric shape. In one embodiment, a turboprop engine inlet may be referred to as "smile" shaped, with one side (typically the top side) concave, the other side (typically the bottom side), convex and with rounded ends (typically the sides). In addition, the inlet defines a complex three-dimensional shape through which the incoming air must pass. However, the current disclosure is not limited to any particular shape of inlet and is applicable to various other applications where the inlet is complex in shape laterally, and/or axially.

The disclosed ported shroud system is useful in the applications described herein, because it provides improved compressor operation in a complex flow environment. The current disclosure is applicable to other applications where improved operation is desired in complex flow environments. So, although described in the aircraft context, various features and characteristics disclosed herein may be used in other contexts and applications where flow improvement is useful. For example, various other engine environments, as well as different types of rotating or otherwise moving machinery will benefit from the features described herein. Thus, no particular feature or characteristic is constrained to an aircraft or an aircraft engine, and the principles are equally embodied in other vehicles, or in other machinery or equipment, such as power generators or compressors in general, and in other applications.

Figure 1:
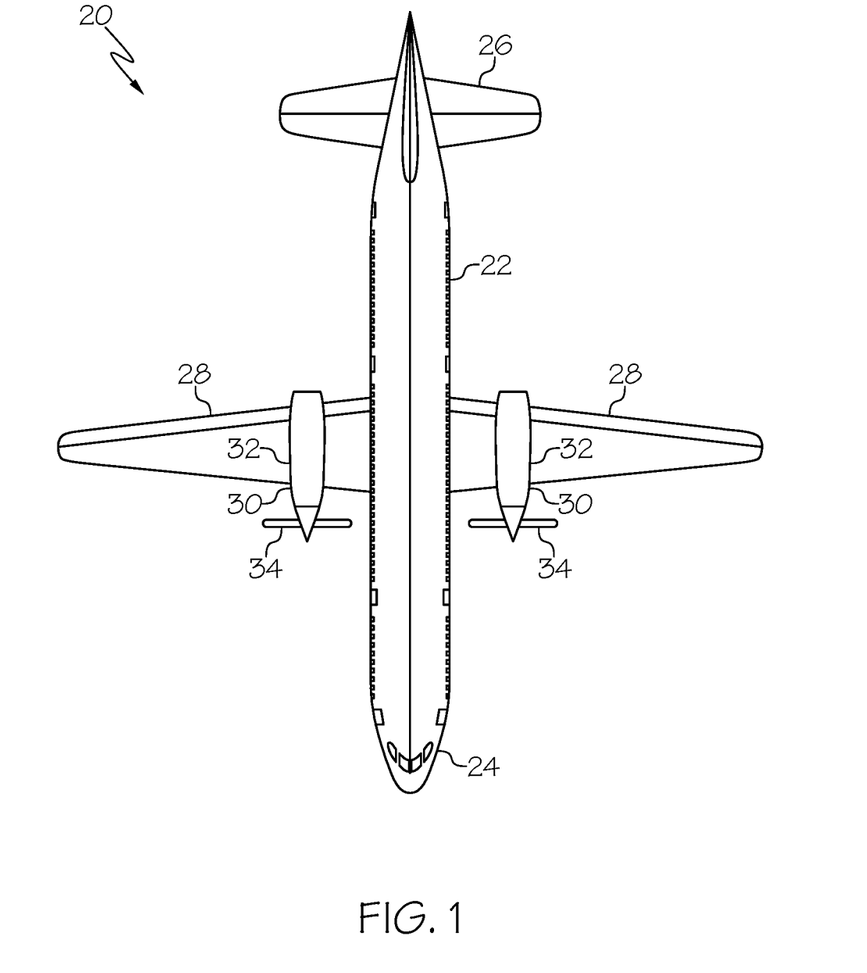
FIG. 1 is a top view of an aircraft, according to an exemplary embodiment.

As noted above, flow optimization with a ported shroud system as described herein may be employed in a variety of applications. By way of an exemplary embodiment as illustrated in FIG. 1, an aircraft 20 is configured to carry passengers and/or cargo. The aircraft 20 includes a fuselage 22 supported by, or integrated with, an airframe. A cockpit 24 is provided in the front of the aircraft 20, and a tail 26 is disposed at the aft. Wings 28 are attached to either side of the fuselage 22, and an engine assembly 30 is attached to each wing 28 and is configured as a turboprop engine in this embodiment. As described in greater detail below, each engine assembly 30 includes a cowling 32 that houses an encloses an engine core (described further below). A propeller 34 is provided on the forward end of each engine assembly 30. The propellers 34 are selectively powered to provide a forward thrust to the aircraft 20. In the depicted embodiment, two engine assemblies 30 are shown, although in other embodiments, alternative configurations and arrangements may be provided. For example, in some embodiments a single turboprop engine may be positioned in the nose cowling of a single engine aircraft. Although FIG. 1 depicts an engine assembly 30 in general, the exemplary embodiments discussed herein may be employed in other applications where flow through a compressor experiences transient deficiencies and/or excesses that if corrected, would improve performance.

Figure 2:
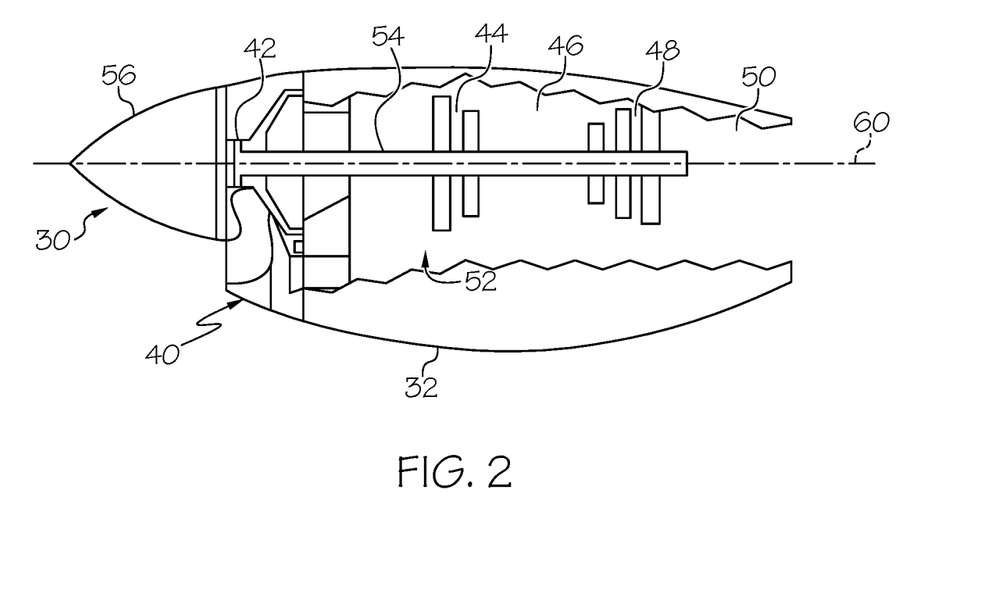
FIG. 2 is a schematic cross-sectional illustration of an engine of the aircraft of FIG. 1, according to an exemplary embodiment.

A schematic, partial, cross-sectional view of one of the engine assemblies 30 is shown in FIG. 2 according to an exemplary embodiment. The engine assembly 30 in general, includes an inlet section 40, a gearbox 42, a compressor section 44, a combustion section 46, a turbine section 48, and an exhaust section 50, all disposed within, or defined by, the cowling 32. The compressor section 44, the combustion section 46, the turbine section 48, and the exhaust section 50 may collectively be referred to as the engine core 52.

During operation, air enters the inlet section 40 from atmosphere and is directed into the compressor section 44. Additional details of the inlet section 40 are provided below. The compressor section 44 may include a series of compressor impellers that increase the pressure of the air, which is then directed into the combustion section 46. In this embodiment, the compressor section 44 includes a two-stage axial compressor. In other embodiments, any number of stages or compressor types, such as axial or centrifugal, are contemplated, including a single stage. In the combustion section 46, the high-pressure air from the compressor section 44 is mixed with fuel and combusted. The combusted air is then directed into the turbine section 48. The turbine section 48 includes a series of turbines, which may be disposed in axial flow series. The combusted air from the combustion section 46 expands through and rotates the turbines of the turbine section 48, from which power is derived. From the turbine section 48, the air is then exhausted from the engine core 52 through the exhaust section 50 to the atmosphere.

In the exemplary embodiment, the turbines of the turbine section 48 are coupled to one or more shafts 54 to drive equipment in the engine assembly 30. Specifically, the turbines may drive the compressors of the compressor section 44. The shaft 54 may additionally be coupled to a hub (or spinner) 56 via the gearbox 42. The propeller 34

(FIG. 1) is mounted on the spinner 56 such that the turbine section 48 may also drive the propeller 34 to provide thrust for the aircraft 20 (FIG. 1). Operation of the engine assembly 30 is conducted over a wide range of ambient conditions and in response to a wide range of operational demands. For example, the engine assembly 30 operates at idle conditions on the ground, under high thrust conditions for climbing to higher elevations, and intermediate thrust conditions for cruise or descent of the aircraft 20. As described below, exemplary embodiments of the inlet section 40 function to influence flow so that the compressor section of the engine assembly 30 is supplied with the optimal airflow for any given operating condition.

Figure 3:
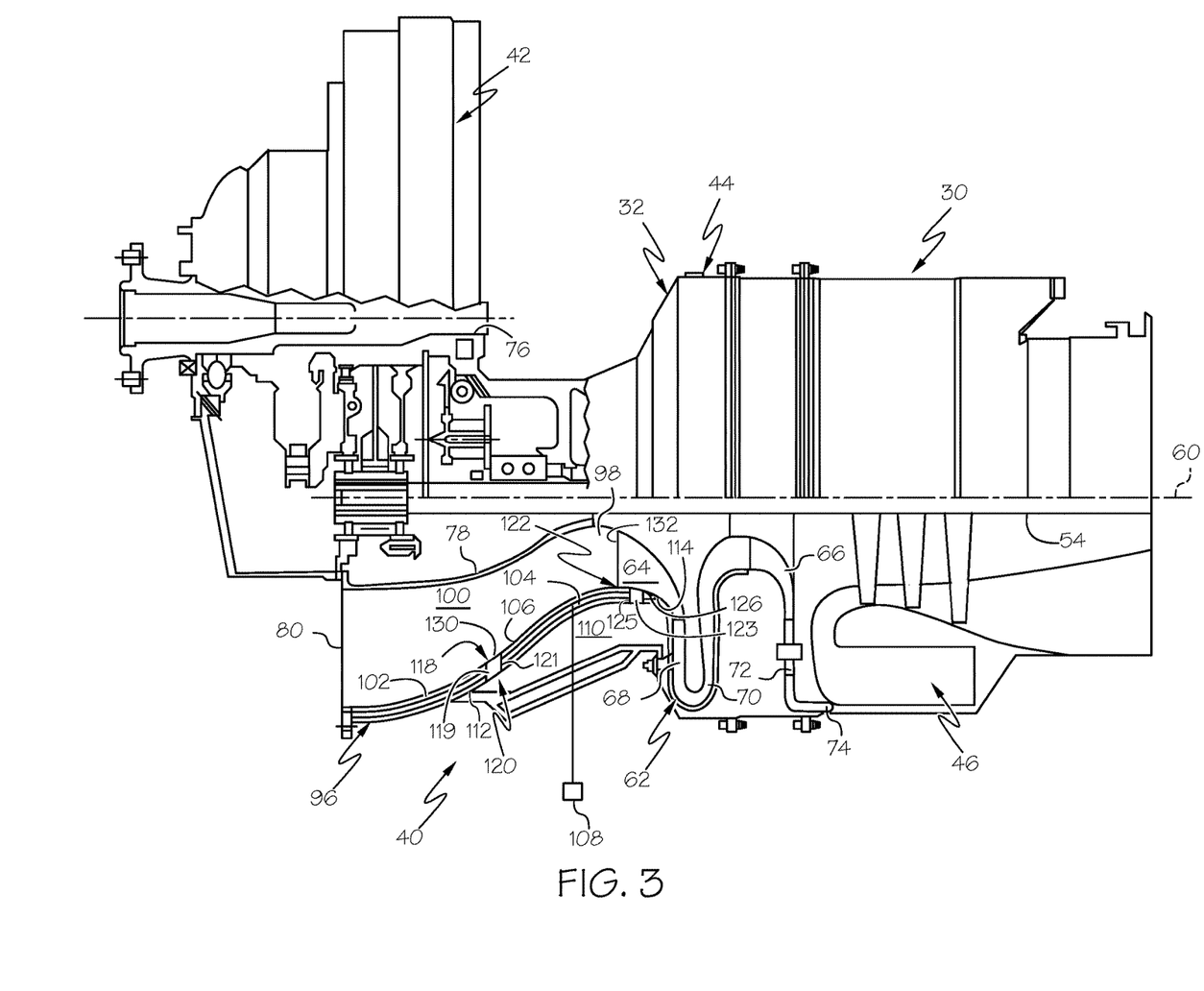
FIG. 3 is a fragmentary, cross-sectional illustration of part of the engine of FIG. 2, according to an exemplary embodiment.

Referring to FIG. 3, a more detailed cross section of the engine assembly 30, in the area of the compressor section 44, is illustrated. The main axis 60 of the engine assembly 30 passes through the center of the shaft 54 and is the nominal center of rotation of the compressor section 44. The compressor section 44 includes a centrifugal, two-stage compressor 62 with a first stage impeller 64 and a second stage impeller 66. The first stage impeller 64 receives incoming air from the inlet section 40 and delivers it to a diffuser section 68 for entry to a transition duct 70. Air in the transition duct 70 is delivered to the second stage impeller 66, and then into a diffuser section 72, through a deswirl 74, and on to the combustion section 46. As noted above, during various operating conditions, the compressor 62 may be provided with too little, or too much air solely from the inlet section 40 for optimal operating conditions.

In the current embodiment, the gearbox 42 is engaged with the shaft 54 and also with a shaft 76 connected with the propeller 34 (FIG. 1). The location of the gearbox 42 occupies space and dictates the shape of the upper portion 78 of the inlet section 40. The resulting shape of the inlet section 40 is shown for this embodiment in FIG. 4, to which additional reference is directed. At its forward end, the inlet section 40 includes an inlet 80, with the smile shape mentioned above. More specifically, the side 82 of the inlet 80 is convex when viewed from the perspective of the inlet airflow, dipping down at its center 84 to make room for the gearbox 42 in an area called the boat tail 86. It should be noted that although the boat tail 86 is at the top of the inlet section 40 in the current embodiment, in other embodiments the boat tail 86 may be located at another location around the axis 60. Returning to the current embodiment, the side 88 of the inlet 80, located opposite the side 82, is concave when viewed from the perspective of the main airflow passage 100. The ends 90, 92 of the inlet 80 are rounded and join with both the sides 82, 88. The result can be described as the smile-like, cashew-like or kidney-like shape of the inlet 80. In addition to the non-annular shape of the inlet 80, the inlet section 40 becomes narrower with less flow area in a direction 94 toward the compressor section 44. As a result, as air moves through the inlet section 40 speed increases and pressure decreases. The result is a complex three-dimensional shaped flow path for the incoming air that varies along the length of the flow path through the inlet section 40.

Figure 4:
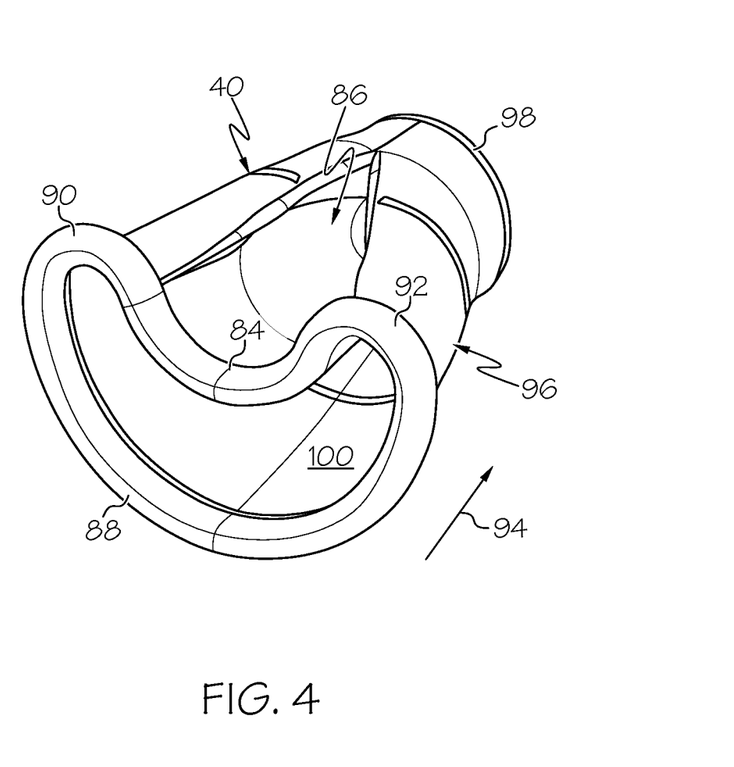
FIG. 4 is an isometric view of the inlet section shroud of the engine of FIG. 3, according to an exemplary embodiment.

The narrowing of the main air flow passage 100 through the inlet section 40 is defined by a shroud 96 thereof, and it extends from the inlet 80 to the compressor section 44 as is also shown in FIG. 3. At the compressor section 44, the main air flow passage transitions to an annulus 98 by which the air flow is delivered to the compressor 62. The shroud 96 in the area of the inlet section 40 includes a double wall section 102 forming an anti-ice passage 104 through which hot air/gas is circulated to prevent the formation of ice on the surface 106 of the inlet section 40. The hot air/gas may be obtained from elsewhere in the engine core 52 such as may be bled from the compressor section 44 combustion section 46, the turbine section 48, or the exhaust section 50. Accordingly, the anti-ice passage 104 is connected with one of those sections as the source 108 of the hot air/gas.

Radially outward relative to the axis 60 from both the main air flow passage 100 and the anti-ice passage 104, the shroud 96 defines a communication plenum 110. The communication plenum 110 extends axially from a first end 112 to a second end 114. In this embodiment the first end 112 is at a forward position and the second end 114 is at a rearward position. More generally, the first end 112 is further from the compressor 62 and the second end 114 is adjacent to the compressor 62 so that the communication plenum 110 extends axially across a portion of the first stage impeller 64. More specifically, the second end 114 is located so that a portion of the communication plenum 110 is disposed directly radially outward from the first stage impeller 64. In this embodiment, the first end 112 is limited in distance from the compressor 62 by the boat tail 86 at higher locations on the inlet section 40. In general, the first end 112 is located as distant from the compressor 62 as the design allows.

The communication plenum 110 is closed except for port system 118, which includes a first port subsystem 120 and a second port subsystem 122. The first port subsystem 120 connects the main air flow passage 100 with the communication plenum 110 and extends through the anti-ice passage 104 without connecting therewith. When extending through the anti-ice passage 104, the opening 119 of the first port subsystem 120 is surrounded by a wall 121 to maintain separation. As indicated, the first port subsystem 120 is located as far from the compressor 62 as the design of the communication plenum 110 will allow. For example, the first port subsystem 120 is located adjacent the first end 112, or as close thereto as practical without inhibiting flow through the first port subsystem 120. The second port subsystem 122 connects the main air flow passage 100 with the communication plenum 110 and extends through the anti-ice passage 104 without connecting therewith. When extending through the anti-ice passage 104, the opening 123 of the second port subsystem 122 is surrounded by a wall 125 to maintain separation. The second port subsystem 122 is located radially outward from the first stage impeller 64 and adjacent the tip 126 thereof, so that the first stage impeller 64 passes across the second port subsystem 122 when the compressor 62 rotates.

In operation, when the compressor 62 demands more air than that supplied through the main flow passage 100, additional air is drawn in through the port system 118. The source for the additional air supplied through the communication plenum 110 is the main flow passage 100, except it is obtained from a point 130 adjacent the first port subsystem 120, which is at a significantly higher pressure than the pressure in the main flow passage 100 at a point 132 adjacent the first stage impeller 64. In these operating conditions, air is drawn into the communication plenum 110 through the first port subsystem 120 and out of the communication plenum 110 through the second port subsystem 122 to supply the compressor 62. Adding the additional flow through the port system 118 improves performance of the compressor 62 such as by delivering increased pressure ratio/power at a given operating point which benefit is achieved from the added flow. In addition under certain operating conditions, flow through the port system 118 is into the communication plenum 110 through the second port subsystem 122 and out of the communication plenum 110 through the first port subsystem 120. Bleeding excess air away from the compressor 62, improves operability such as by reducing the effective inlet area of the impeller 64, or by reducing the incidence of impeller 64 to reduce the likelihood of stall or surge. The port system 118 is adaptable to complex inlet shapes such as those found in a turboprop engine and accomplishes dual performance/operability benefits by moving air between the compressor 62 and the higher pressure point 130 upstream in the inlet section 40. In addition, the port system is adaptable to an engine with hot air anti-icing capability by moving air through the anti-ice passage 104 without mingling with the heated gas therein.

Figure 5:
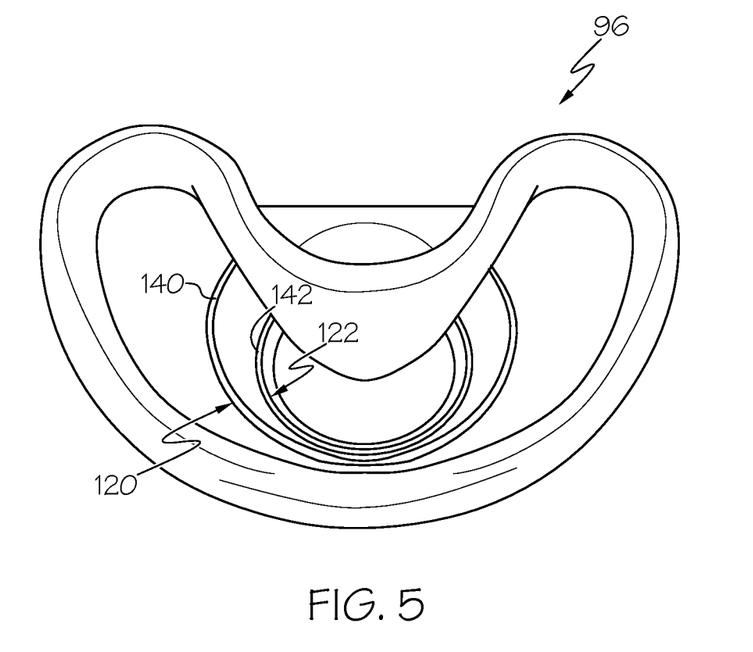
FIGS. 5-7 are end views of a shroud of the engine of FIG. 3, according to various exemplary embodiments.
Figure 6:
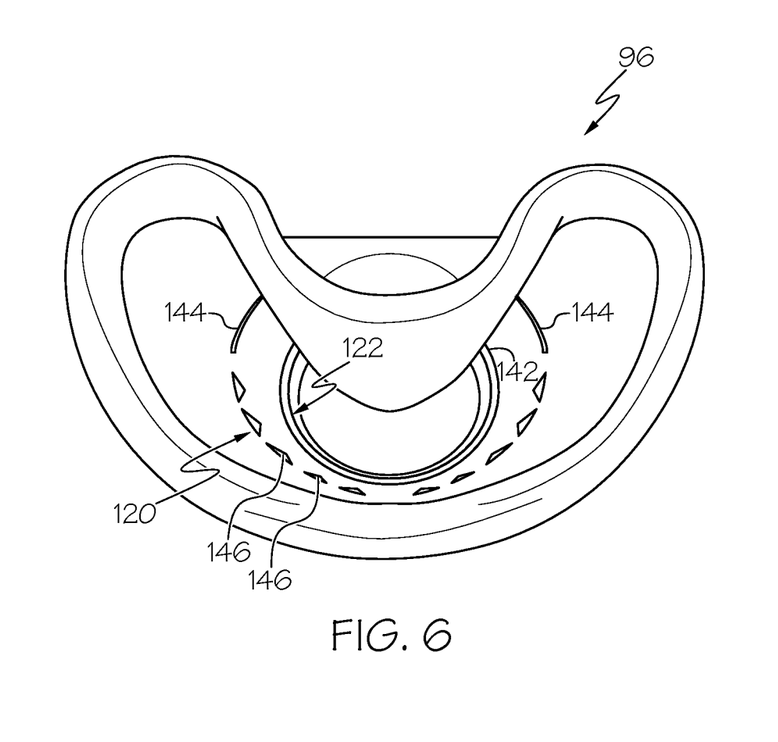
Figure 7:
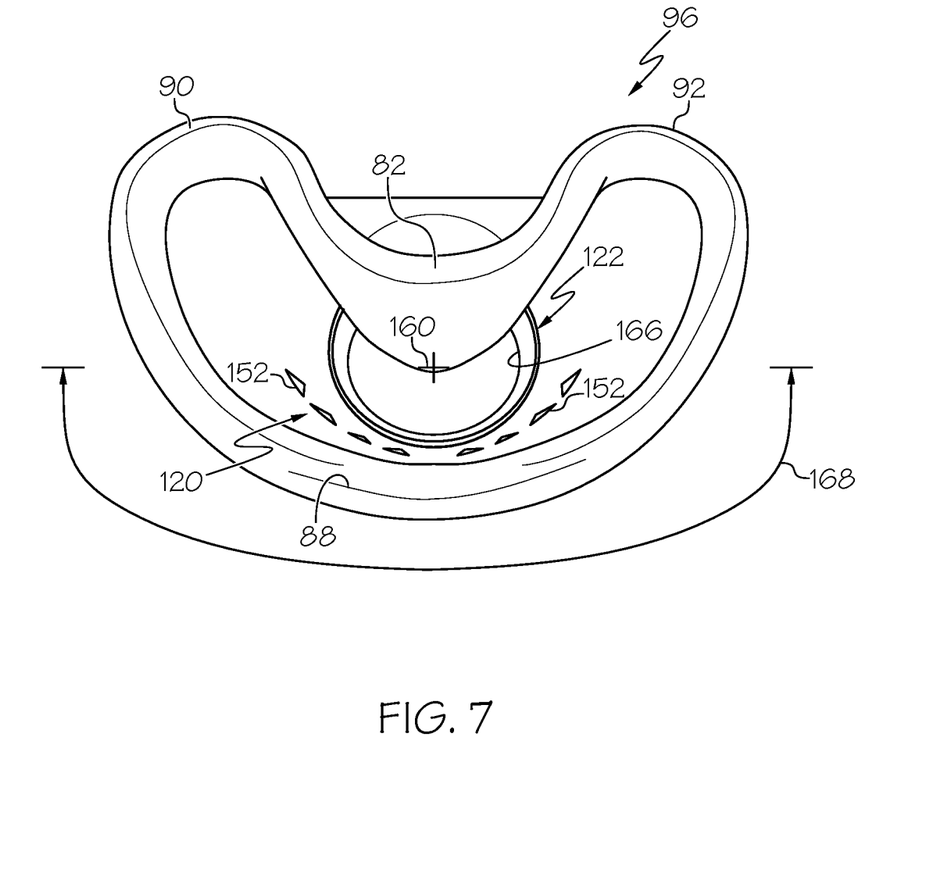

Referring to FIGS. 5-7, variations of the port system 118 are illustrated FIG. 5 depicts slots 140, 142 as the first and second port subsystems 120, 122, respectively. FIG. 6 depicts a combination of a slot 144 and a set of discrete openings 146 as the first port subsystem 120. FIG. 7 depicts a set of discrete openings 152, as the first port subsystems 120. The variation of FIG. 5 may be used in a number of applications and for example, where hot air anti-icing capability is not included. The variation of FIG. 6 may be used in a number of applications and for example, where hot air anti-icing is used on the lower surface of the inlet section 40 but not on the upper surface. The variation of FIG. 7 may be used in a number of application and for example, where anti-icing is used. In the variations of FIGS. 5-7, the openings of the first port subsystem 120 are aligned with each other in a first arc. The first and second arcs are spaced apart along the axis 60. In addition, the variation of FIG. 7 includes the openings 152, only on an opposite side of the center 160 of the rear opening 166 of the inlet section 40 from the boat tail 86 (in this embodiment below the center 160, which may coincide with the axis 60) to avoid flow distortion that would otherwise be caused by any higher placed openings. This is because it has been found that in all operating conditions, flow through any first port subsystem openings located above the center 160 is always in a direction out of the plenum 110 through the first port subsystem openings, even in conditions when inflow to the plenum at that location is preferred. Accordingly, the openings in the variation of FIG. 7 are all located within a 180-degree area 168 on one side of the axis 60 that is the same side on which the convex side 88 of the inlet 80 is disposed.

Figure 8:
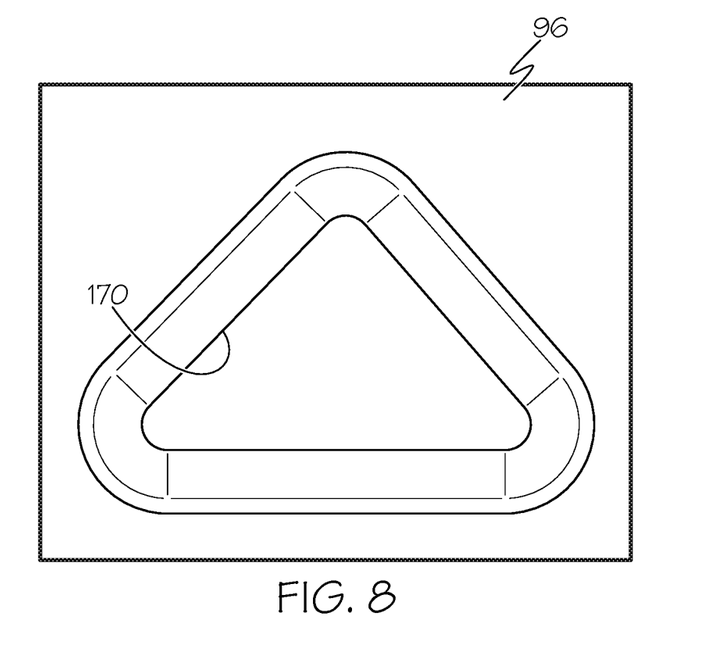
FIGS. 8-9 are detail views of port openings of the shroud of the engine of FIG. 3, according to various exemplary embodiments.
Figure 9:
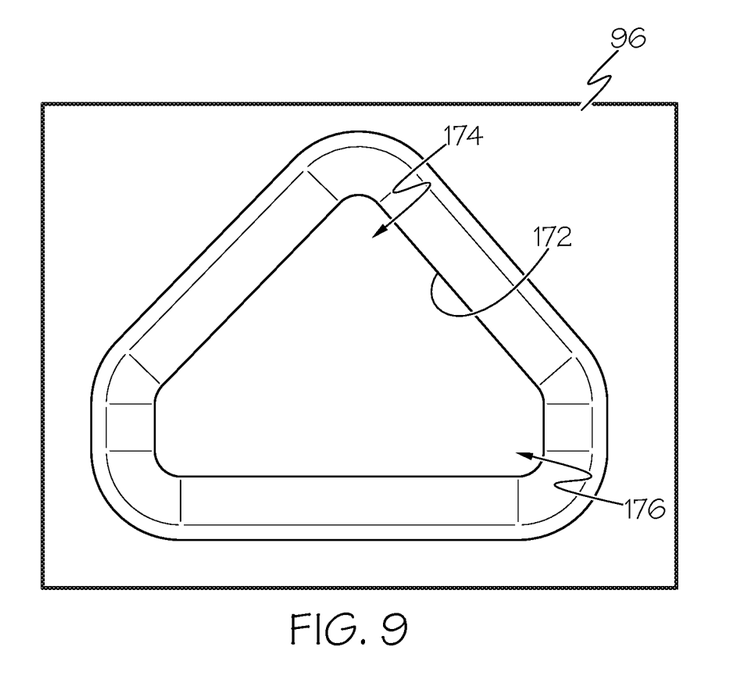

Referring to FIGS. 8 and 9, embodiments of the openings 146, 152, are illustrated. In FIG. 8, triangular opening 170 has a three-sided triangular shape. In FIG. 9, house shaped opening 172 has a five-sided shape with a triangular section 174 and a contiguous rectangular section 176 and is so-called due to its similarity to a common house profile. The house opening 172 provides a shape that provides a larger opening in a relatively small package. It will be understood that the openings 146, 152, may have any shape, but the triangular opening 170 and the house opening 172 facilitate manufacturability by additive manufacturing. For example, the inlet section 40 may be printed with the openings 170, 172 formed during the printing without a need for a temporary supporting structure. This provides a cleaner post-printed part requiring less post-printing work.

Through the foregoing embodiments, a ported inlet system provides improved performance and operability, with simplified manufacturability. While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A system for delivering a flow stream of a gas to a compressor, comprising:
   a shroud extending from an inlet to the compressor, the shroud defining, at least in part:
      a main inlet passage configured to direct the flow stream from the inlet to the compressor, the main inlet passage including a first section adjacent the inlet, the first section having a smile shape at the inlet and the main inlet passage transitioning from the first section to a second section adjacent the compressor and around an impeller of the compressor, the second section having an annulus shape;
      a communication plenum separated from the main inlet passage; and
      a port system that includes first and second port subsystems each providing an opening between the main inlet passage and the communication plenum, the first port subsystem disposed further from the compressor than the second port subsystem, the first port subsystem disposed in the first section and the second port subsystem disposed in the second section;
   wherein the port system is configured to: deliver a first portion of the gas through the port system into the first port subsystem and out of the second port subsystem providing increased flow through the compressor at a given operating point and alternatively, a second portion of the gas exits the compressor through the port system into the second port subsystem and out of the first port subsystem to bleed the second portion back to the main inlet passage.

2. The system of claim 1, wherein the impeller is rotatable about an axis, and the second port subsystem is disposed radially outward from the impeller so that the impeller is configured to pass across the opening provided by the second port subsystem, and wherein the first port subsystem, in its entirety, is disposed at a location that is radially outward further than all parts of the impeller.

3. The system of claim 1, wherein the plenum extends from a first end proximate to the compressor to a second end distant from the compressor, wherein the first port subsystem is disposed adjacent the second end, wherein the first port subsystem opens to the main inlet passage at a point where pressure in the main inlet passage is at a level that causes air to be drawn into the communication plenum through the first port subsystem and out of the communication plenum through the second port subsystem to supply the compressor to deliver increased pressure ratio.

4. The system of claim 1, wherein the shroud defines an anti-ice passage configured to circulate a heated gas, wherein the first and second port subsystems extend through the anti-ice passage.

5. The system of claim 1, comprising an inlet section of a turboprop engine, wherein the shroud defines a part of the inlet section.

6. The system of claim 1, wherein each the openings of the first and second port subsystems has a triangular shape.

7. The system of claim 1, wherein:
   the compressor is configured to rotate about an axis;

the inlet has a convex side disposed on one side of the axis; and the openings of the first and second port subsystems are all disposed exclusively within a 180 degree area on the one side of the axis.

8. The system of claim 1, comprising:

a shaft extending through the compressor; and a gearbox connected with the shaft;

wherein the first section extends around the gearbox and transitions to the second section which is disposed around the shaft at the compressor.

9. The system of claim 1, wherein the port system is further configured to:

inhibit, by the disposition of the second port subsystem in the second section, at least one of stall and surge through enabling, the second portion of the gas to enter the plenum from the main inlet passage through the second port subsystem and exit the plenum to the main inlet passage through the first port subsystem, and increase, by the disposition of the first port subsystem in the first section, at least one of pressure ratio and power at a given operating point of the compressor, through alternatively enabling, the first portion of the gas to enter the plenum from the main inlet passage through the first port subsystem and exit the plenum to the main inlet passage through the second port subsystem.

10. A system for delivering a flow stream of a gas, comprising:

a compressor configured to receive the gas and to increase a pressure of the gas, the compressor including an impeller rotatable about an axis;

a shroud extending from an inlet that is open to atmosphere to the compressor at a location around the impeller, the shroud defining, at least in part:

a main inlet passage configured to direct the gas from the inlet to the compressor, the main inlet passage transitioning from a first shape at the inlet to a second shape at the compressor that differs substantially from the first shape, the main inlet passage including a first section adjacent the inlet, the first section having a smile shape at the inlet and the main inlet passage transitioning from the first section to a second section adjacent the compressor and around the impeller of the compressor, the second section having an annulus shape;

a communication plenum separated from the main inlet passage; and a port system that includes first and second port subsystems each providing an opening between the main inlet passage and the communication plenum, the first port subsystem disposed further from the compressor than the second port subsystem, the first port subsystem disposed in the first section and the second port subsystem disposed in the second section;

wherein the port system is configured so that a portion of the gas enters the plenum from the main inlet passage through the second port subsystem and exits the plenum to the main inlet passage through the first port subsystem when the compressor has an excess of the gas, and the port system is configured so that alternatively, a portion of the gas enters the plenum from the main inlet passage through the first port subsystem and exits the plenum to the main inlet passage through the second port subsystem when the compressor has a deficiency of the gas.

11. The system of claim 10, wherein the second port subsystem is disposed radially outward from the impeller so that the impeller is configured to pass across the opening provided by the second port subsystem.

12. The system of claim 11, wherein the plenum extends from a first end proximate to the compressor to a second end distant from the compressor, wherein the first port subsystem is disposed adjacent the second end.

13. The system of claim 10, wherein the shroud defines an anti-ice passage configured to circulate a heated gas, wherein the first and second port subsystems extend through the anti-ice passage, wherein each of the openings of the first and second port subsystems is surrounded by a wall when extending through the anti-ice passage.

14. The system of claim 10, comprising an inlet section of a turboprop engine, wherein the shroud is a part of the inlet section.

15. The system of claim 10, wherein each of the openings of the first and second port subsystems has a triangular shape.

16. The system of claim 10, wherein:

the inlet has a convex side disposed on one side of the axis; and the openings of the first and second port subsystems are all disposed exclusively within a 180 degree area on the one side of the axis.

17. The system of claim 10, comprising:

a shaft extending through the compressor; and a gearbox connected with the shaft;

wherein the shroud extends around the gearbox and transitions to the second section which is disposed around the shaft at the compressor.

18. The system of claim 10, wherein the openings of the first port subsystem are aligned with each other in a first arc and the openings of the second port subsystem are aligned with each other in a second arc.

19. The system of claim 18, wherein the first and second arcs are spaced apart along the axis.

20. A system for delivering a flow stream of gas in an engine, comprising:

a compressor configured to receive the gas and to increase a pressure of the gas directed into the engine, the compressor including an impeller that is rotatable about an axis;

a shroud extending from an inlet that is open to atmosphere to the compressor at a location around the impeller, the shroud defining, at least in part:

a main inlet passage configured to direct the gas from the inlet to the compressor, the main inlet passage transitioning from a first shape at the inlet to a second shape at the compressor that differs substantially from the first shape;

a communication plenum separated from the main inlet passage; and a port system with first and second port subsystems, the first port subsystem providing a first opening between a first point of the main inlet passage and the communication plenum, the second port subsystem providing a second opening between a second point of the main inlet passage and the communication plenum, the first point configured with a higher pressure in the flow stream than the second point and the first port subsystem disposed further from the compressor than the second port subsystem;

wherein the shroud defines an anti-ice passage configured to circulate a heated gas, wherein the first and second port subsystems extend through the anti-ice passage, wherein each of the openings of the first and second port subsystems is surrounded by a wall when extending through the anti-ice passage;

wherein the port system is configured so that a portion of the gas enters the plenum from the main inlet passage through the second port subsystem and exits the plenum to the main inlet passage through the first port subsystem to inhibit stall of the compressor when the compressor has an excess of the gas, and the port system is configured so that alternatively, a portion of the gas enters the plenum from the main inlet passage through the first port subsystem and exits the plenum to the main inlet passage through the second port subsystem to increase power output from the compressor when the compressor has a deficiency of the gas.

* * * * *